United States Patent [19]

Rehmer et al.

[11] Patent Number: 5,128,386
[45] Date of Patent: Jul. 7, 1992

[54] UV-CROSSLINKABLE MATERIALS BASED ON (METH)ACRYLATE POLYMERS

[75] Inventors: Gerd Rehmer, Beindersheim; Andreas Boettchher, Nussloch; Gerhard Auchter, Duerkheim, all of Fed. Rep. of Germany

[73] Assignee: BASF Aktiengesellschaft, Ludwigshafen, Fed. Rep. of Germany

[21] Appl. No.: 451,085

[22] Filed: Dec. 15, 1989

[30] Foreign Application Priority Data

Dec. 31, 1988 [DE] Fed. Rep. of Germany ....... 3844445

[51] Int. Cl.$^5$ ................................. C08F 2/46
[52] U.S. Cl. ........................ 522/35; 522/83;
522/112; 522/152; 522/154; 522/904; 522/905;
524/272; 525/218; 525/220; 526/243; 526/244;
526/286; 526/288; 526/289; 526/298; 526/301;
526/302; 526/304; 526/311; 526/312; 526/314
[58] Field of Search ................ 522/905, 34, 35, 904,
522/243, 244, 288, 289, 286, 298, 301, 302, 304,
311, 312, 314

[56] References Cited

U.S. PATENT DOCUMENTS

| | | | |
|---|---|---|---|
| 2,384,124 | 9/1945 | Muskat | 526/291 |
| 3,661,618 | 5/1972 | Brookman et al. | 522/121 |
| 3,716,571 | 2/1973 | Berlin | 526/314 |
| 3,748,133 | 7/1973 | Noonan | 430/288 |
| 3,926,641 | 12/1975 | Rosen | 522/905 |
| 4,144,157 | 3/1979 | Guse et al. | 428/483 |
| 4,148,987 | 4/1979 | Winey | 522/905 |
| 4,610,746 | 9/1986 | Broer | 522/905 |
| 4,737,559 | 4/1988 | Kellen et al. | 526/291 |
| 4,914,004 | 4/1990 | Kohler | 522/905 |

FOREIGN PATENT DOCUMENTS

| | | |
|---|---|---|
| 563029 | 9/1983 | Australia . |
| 0017364 | 10/1980 | European Pat. Off. . |
| 2411169 | 9/1974 | Fed. Rep. of Germany . |
| 2357486 | 5/1975 | Fed. Rep. of Germany . |
| 6601711 | 4/1971 | Netherlands . |

*Primary Examiner*—Marion E. McCamish
*Assistant Examiner*—Arthur H. Koeckert
*Attorney, Agent, or Firm*—Oblon, Spivak, McClelland, Maier & Neustadt

[57] ABSTRACT

UV-crosslinkable materials based on (meth)acrylate copolymers contain copolymerized monomers of the general formula I $$\underset{R \quad R^1}{\overset{O}{\underset{\|}{C}}} \qquad (I)$$

where R is a certain alkyl radical, an aryl radical or a radical $R^1$ and $R^1$ is a radical where $R^2$ to $R^6$ are each H, alkyl, a non-ortho OH group, $OCH_3$, $OC_2H_3$, SH, $SCH_3$, Cl, F, CN, COOH, $COO(C_1-C_3\text{-alkyl})$, $CF_3$, $N(CH_3)_2$, $N(C_2H_5)_2$, $N(CH_3)C_6H_5$, $+N(CH_3)_3X^-$ or $+N(CH_3)_3X^-$, where $X^-$ is an acid anion, and one or more of the radicals $R^2$ to $R^6$ are each a radical where Sp is one of the spacer groups of the following type $$-((X)_k Y)_l - (X)_m -$$

$$-((X)_k Y)_l - ((X)_m Y)_n -$$

and
R', R" and R''' are each H or a certain hydrocarbon, and where the radicals X may be identical or different and are each a divalent, alkylene radical, a cycloalkylene radical or phenylene radical, which are bonded directly to one another and/or are bonded to one another by identical or different groups Y, and Y is a divalent radical from the group consisting of $$-O-, -S-, -O\overset{O}{\underset{\|}{C}}, -N-\overset{O}{\underset{\|}{C}}-, -N-\overset{O}{\underset{\|}{C}}-N-, -S-,$$
$$\quad\quad\quad\quad\quad\quad\quad R' \quad\quad R' \quad R'$$

$$-\overset{O}{\underset{\underset{\|}{O}}{S}}- \text{ and } -O-\overset{O}{\underset{\|}{C}}-O-$$

4 Claims, No Drawings and k and m are each from 1 to 10 and l and n are each from 0 to 25.

UV-CROSSLINKABLE MATERIALS BASED ON (METH)ACRYLATE POLYMERS

The present invention relates to materials which are crosslinkable with UV light in the air and can be used in particular as hotmelt adhesives, for coating mineral substrates, for example roof tiles, and as surface coatings. The materials should have high reactivity to UV radiation. When used as hotmelt adhesives, the products should have a low melt viscosity, good tack and high heat distortion resistance.

Dutch Patent 6 601 711 discloses contact adhesive tapes which are produced by coating a sheet-like substrate with a polyacrylate adhesive, one or more monomeric acrylates, for example 2-ethylhexyl acrylate, being present and polymerization being effected by UV irradiation and subsequent heating. To obtain useful results, however, exposure must be carried out under an inert gas atmosphere. Furthermore, the presence of readily volatile acrylates which may irritate the skin and eyes is a disadvantage.

U.S. Pat. No. 3,661,618 furthermore discloses a process for the preparation of adhesives, in which mixtures of acrylates and methacrylates, such as 2-ethylhexyl acrylate, with organic polymers, such as cellulose derivatives, polyolefins or polyesters, as viscosity regulators and, if required, together with a tackifier, such as polyvinyl methyl ether, are applied in a thin layer to a sheet-like substrate and treated with high energy radiation. Here too, the presence of monomeric (meth)acrylates which have an irritant effect and are readily volatile is a disadvantage, and furthermore only products whose cohesion is insufficient for many applications in the contact adhesives sector are obtained.

In the process of German Laid-Open Application DOS 2,357,486 for the production of self-adhesive coatings, ionizing radiation is used for irradiation, in particular of a mixture which is liquid at room temperature and consists of (A) a monoolefinically unsaturated monomer which forms tacky polymers at room temperature,
(B) a diolefinically or polyolefinically unsaturated compound,
(C) a polymer having a softening point of less than 50° C. and a mean molecular weight of from 500 to 10,000 and
(D) a conventional photoinitiator, eg. benzoin, acetophenone or benzophenone, and which is likewise applied to a sheet-like substrate. In this process too, acrylates and methacrylates of alkanols of 4 to 12 carbon atoms can be used as monomers (A). Although the adhesives layers produced by this process have high shear strength at room temperature and good surface tack, they have relatively pronounced cold flow and possess insufficient shear strengths at elevated temperatures.

High energy radiation is also used in the process of Australian Patent 563,029, in which self-adhesive coatings are obtained by coating substrates with derivatives of dihydroxypropylacrylates mixed with polymers having a glass transition temperature of less than 0° C. and a K value of from 20 to 80 and/or a tackifier. Although good surface tack and good heat distortion resistance are obtained here, the irritant effect of the monomers and the necessity of working under an inert gas atmosphere are disadvantages.

Since photoinitiators are present in materials which are to be crosslinked using UV radiation, these photoinitiators should as far as possible be readily soluble in the materials and should not be exuded from the materials, so that the latter can also be processed at elevated temperatures. Furthermore, when exposed to radiation, these photoinitiators should not form any degradation products which have a strong intrinsic odor and tend to exude.

Hence, copolymerizable photoinitiators have also been concomitantly used in UV-curable materials. Thus, EP-A-0 017 364 describes, for example, copolymers which are suitable, inter alia, as adhesives and for sealing compounds and contain from 0.1 to 10% by weight of allylbenzoyl benzoate as a copolymerized photoinitiator. Although these materials can be crosslinked using UV radiation, they give crosslinked products having a very high viscosity. Furthermore, their reactivity toward UV radiation is too low, and tacky layers produced from them do not meet the requirements set for a good contact adhesive. Moreover, irritant monomers are also present in this process (Example 10).

According to German Laid-Open Application DOS 2,411,169 (=U.S. Ser. No. 339,593), contact adhesives which are crosslinkable with ultraviolet radiation can be prepared using copolymers of (meth)acrylates which contain monoolefinically unsaturated ether and ester derivatives of substituted benzophenones as copolymerized photoinitiators. However, the copolymerized benzophenone derivatives are not very reactive toward UV radiation, and the pressure-sensitive adhesives prepared from the copolymers do not meet high requirements. Furthermore, hotmelt adhesives prepared in this way have too high a melt viscosity, which prevents them from being used in practice.

U.S. Pat. No. 4,144,157 claims a process for the preparation of products rendered self-adhesive with crosslinked copolymers containing predominantly acrylates, wherein, in the preparation of the self-adhesive polymers, from 0.01 to 5% by weight of a 2-alkoxy-2-phenyl-2-benzoylethyl acrylate or methacrylate are copolymerized in the said polymers, which are applied to a substrate and then crosslinked by exposure to ultraviolet light for a short time. A disadvantage of these photoinitiators is their low reactivity and efficiency.

U.S. Pat. No. 4,737,559 discloses contact adhesives which are crosslinkable with UV radiation, are based on polyacrylates and contain monoolefinically unsaturated benzophenone derivatives as copolymerized photoinitiators. These contact adhesives are intended to be used in the medical area, for example for plasters, and their adhesion to the skin should not increase in the course of time. However, a disadvantage of these contact adhesives is that they have only low reactivity toward UV radiation and a comparatively high melt viscosity.

We have found that UV-crosslinkable materials based on (meth)acrylate copolymers having a K value of from 10 to 150 are particularly advantageous if they contain from 0.01 to 20% by weight, based on the copolymers, of copolymerized monomers of the general formula I

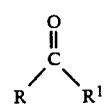

where R is a straight-chain alkyl of 1 to 3 carbon atoms, a branched, unsubstituted or substituted alkyl of 3 or 4 carbon atoms, aryl or a radical $R^1$ and $R^1$ is a radical

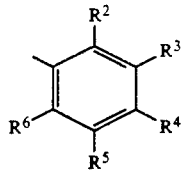

where $R^2$ to $R^6$ are identical or different and are each H, alkyl of 1 to 4 carbon atoms, a non-ortho OH group, $OCH_3$, $OC_2H_5$, SH, $SCH_3$, Cl, F, CN, COOH, $COO(C_1-C_3$-alkyl), $CF_3$, $N(CH_3)_2$, $N(C_2H_5)_2$, $N(CH_3)C_6H_5$, $^+(CH_3)_3X^-$, $^+N(CH_3)_2X^-$, where $X^-$ is an acid anion, eg. $Cl^-$, $Br^-$, acetate, $HSO_4^-$, $H_2PO_4^-$ or $NO_3^-$ and one or more of the radicals $R^2$ to $R^6$ are a radical

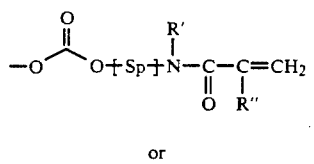

or

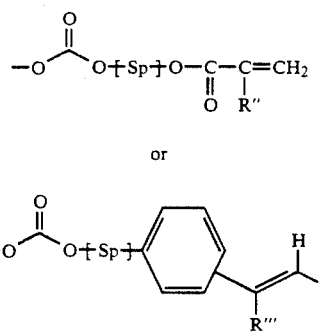

or

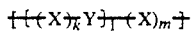

where Sp is one of the spacer groups of the following type

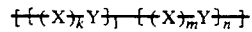

and/or $\{\{(X)_k Y\}_l\{(X)_m Y\}_n\}$ and

R' is H, $C_1$-$C_4$-alkyl or phenyl,
R" is H or $C_1$-$C_4$-alkyl,
R''' is H or $CH_3$ and where the radicals X may be identical or different and are each a divalent, unsubstituted or substituted alkylene radical which may be perfluorinated, eg. $-CH_2-$, $-CH_2-CH(CH_3)-$ or $-CF_2-$, unsubstituted or substituted cycloalkylene of 5 to 10 carbon atoms or an unsubstituted or substituted o-, m- or p-phenylene radical, which are bonded directly to one another and/or bonded to one another by identical or different groups Y, and Y is a divalent radical from the group consisting of

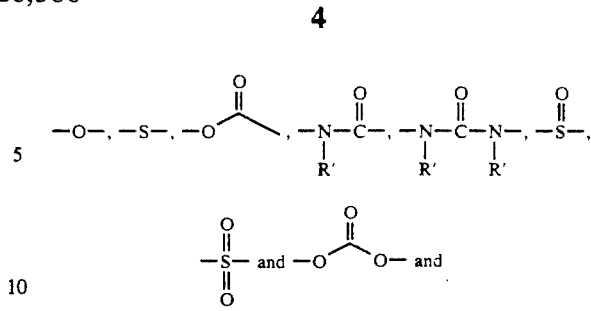

k and m are each from 1 to 10 and
l and n are each from 0 to 25.

According to the invention, preferred UV-crosslinkable materials are those based on (meth)acrylate copolymers having a K value of from 15 to 150 and containing from 0.01 to 20% by weight, based on the copolymers, of copolymerized monomers of the general formula IA

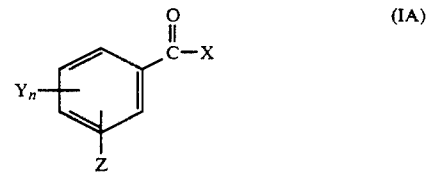

where
X is alkyl of 1 to 3 carbon atoms or phenyl which is unsubstituted or substituted by n Y groups,
Y is $-H$, $-CF_3$, $-O-$alkyl and/or alkyl$-COO-$, each having 1 to 4 carbon atoms in the alkyl group, halogen, $-CN$, $-COOH$ or a non-ortho OH group,
n is from 0 to 4 and
Z is a group of the general formula

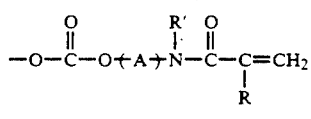

or

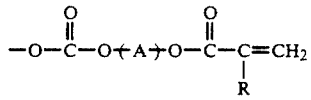

where
R' and R are each H, $C_1$-$C_4$-alkyl or phenyl and
A is a unsubstituted or substituted alkylene, oxoalkylene, arylene or polyoxaalkylene radical of 2 to 12 carbon atoms which may be interrupted by ester groups.

Copolymers generally contain, as principal monomers, predominant amounts, in general from 50 to 99.99, preferably from 70 to 97.5, % by weight of acrylates and/or methacrylates of alkanols of 1 to 24, in particular 1 to 12, carbon atoms, such as methyl, ethyl, propyl, isoamyl, isooctyl, n-butyl, isobutyl, tert-butyl, cyclohexyl, 2-ethylhexyl, decyl, lauryl and stearyl acrylate and/or methacrylate as copolymerized units. Examples of suitable comonomers are vinyl esters of saturated carboxylic acids of 1 to 20, in particular 2 or 3, carbon atoms, such as vinyl formate, vinyl acetate, vinyl propionate and vinyl laurate and vinyl stearate, vinyl ethers of 3 to 22 carbon atoms, such as methyl, ethyl, butyl, hexyl or octadecyl vinyl ether, vinylaromatics of 8 to 12 carbon atoms, in particular styrene or α-methylstyrene, vinyltoluenes, tert-butylstyrene and halosytrenes, olefins of 2 to 20 carbon atoms, in particular ethylene, propylene and n-butylene, isobutylene, diisobutene, triisobutene and oligopropylenes, and/or vinyl halides, in particular vinyl chloride and vinylidene chloride, and allyl ethers or allyl esters. Also of particular interest are copolymers which, in addition to other acrylates and methacrylates, contain, as copolymerized comonomers, from 0.5 to 20, preferably from 2 to 10, % by weight, based on the copolymers, of tetrahydrofurfur-2-yl acrylate or methacrylate and/or 5-(2-tetrahydrofurfurylmethoxycarbonyl)-pentyl (meth)acrylate, alkoxycontaining monomers, such as 3-methoxybutyl (meth)-acrylate, 2-methoxyethyl (meth)acrylate, 2-butoxyethyl (meth)acrylate, 2-ethoxyethyl (meth)acrylate, N-butoxymethyl (meth)acrylamide and/or N-isobutoxymethyl (meth)acrylamide, tetrahydrofurfur-2-yl acrylate and methacrylate and 3-methoxybutyl acrylate and methacrylate being preferred.

Particularly advantageously, copolymers additionally contain from 0.1 to 10, preferably from 0.5 to 4, % by weight of α,β-monoolefinically unsaturated monoand/or dicarboxylic acids of 3 to 5 carbon atoms and/or their amides or, if required, monoalkyl esters or anhydrides of the dicarboxylic acids as copolymerized units. Particular examples of these are acrylic acid, methacrylic acid and itaconic acid, as well as crotonic acid, fumaric acid, maleic acid, maleic anhydride, monon-butyl maleate, monoethyl fumarate, monomethyl itaconate and monomethyl maleate. Among the amides of such carboxylic acids, acrylamide and methacrylamide are of particular interest. N-Methylacrylamide and -methacrylamide, N-methylolacrylamide and -methacrylamide, maleic acid mono- and diamide, itaconic acid mono- and diamide and fumaric acid mono- and diamide are also suitable. In some cases, from 0.1 to 5% by weight, based on the copolymers, of vinylsulfonic acid or vinylphosphonic acid are also suitable.

The copolymers may contain further polymerized comonomers, in addition to the abovementioned principal monomers. Suitable comonomers of this type, in amounts of not more than 30, preferably from 0.5 to 5, % by weight, include olefinically unsaturated tertiary amino compounds, such as N,N-dimethyl(meth)acrylamide, N,N-diethyl(meth)acrylamide, N,N-diisopropyl-(meth)acrylamide, N,N-diisobutyl(meth)acrylamide, N,N-diethylaminoethyl-(meth)acrylate, 4-(N,N-dimethylamino)-styrene, 4-(N,N-diethylamino)-styrene, dimethyl- and diethylaminoethyl vinyl ether, N-vinylimidazole, N-vinylimidazoline, vinylpyridines, dialkyl(meth)acrylamides, N-vinylformamide, N-vinylpyrrolidone, N-vinylcaprolactam, p-hydroxy(meth)acrylanilide, N-tert-butyl (meth)acrylamide, diacetone(-meth)acrylamide,N-(1-methylundecyl)(meth)acrylamide, N-isobornyl(meth)acrylamide, N-adamantyl(-meth)-acrylamide, N-benzyl(meth)acrylamide, N-4-methylphenyl-(meth)acrylamide, methyl(meth)acrylamide, N-diphenylmethylacrylamide, phthalimidomethyl(meth)acrylamide,-(meth)acrylamidohydroxyacetic acid, (meth)acrylamidoacetic acid, (meth)acrylamidoacetates, such as methyl (meth)acrylamidoacetate, 2-(meth)acrylamido-2-methylbutyric acid, N-(2,2,2-trichloro-1-hydroxyethyl)(meth)-acrylamide, N,N-bis-(2-cyanoethyl)methacrylamide, N-(1,1,1-trishydroxymethyl)(meth)acrylamide, methyl(meth)acrylamide and N-(3-hydroxy-2,2-dimethylpropyl)(meth)-acrylamide. Further examples are 2-hydroxy-3-[N,N-di-(2-hydroxyethyl)]-propyl (meth)acrylate, 2-methoxy-3-[N,N-alkyl]-propyl (meth)acrylates and/or 2-hydroxy-3-[N,N-dialkyl]-propyl (meth)acrylate where alkyl is of 1 to 10 carbon atoms, such as 2-hydroxy-3-[N-hydroxyethyl-N-methyl]-propyl (meth)acrylate and 2-hydroxy-3-[N-ethylN-methyl]-propyl (meth)acrylate. Finally, monoolefinically unsaturated monomers from the group consisting of -cyclohexylprop-1-yl (meth)acrylate, cyclohexyl (meth)-acrylate, 4-tert-butylcyclohexyl (meth)acrylate, 2-N-morpholinoethyl (meth)acrylate, 2-N-morpholino-n-hexyl (meth)acrylate and furfuryl (meth)acrylate, isobornyl (meth)acrylate, cyclohexyl (meth)acrylate and isobornyl (meth)acrylate are suitable, also in amounts of not more than 30, preferably from 0.1 to 25, particularly preferably from 0.5 to 20, % by weight. It is also possible to use silicon-containing comonomers, for example vinyltrimethoxysilane, (meth)acryloxypropyltrimethoxysilane and vinyltriethoxysilane, in amounts of not more than 10% by weight.

The novel copolymers have K values of from 10 to 150, in general from 15 to 100, determined according to DIN 53,726 in 1% strength solution in tetrahydrofuran at 25° C. The K value is preferably from 25 to 50 if the materials are to be used as hotmelt adhesives. If it is intended to employ the materials for coating roof tiles, the K values are preferably from 60 to 100, and materials which are to be used for surface coatings preferably have K values of from 15 to 85.

The UV-crosslinkable materials which, in the case of contact adhesives, are applied in the form of their melts, generally have viscosity numbers of from 0.10 to 1.60, preferably from 0.2 to 0.9, very particularly preferably from 0.25 to 0.49, 100 ml/g (measured in tetrahydrofuran at 25° C.).

The monomers of the general formula I are obtainable, for example, by reacting either a compound of the general formula (2)

The monomers of the general formula I are obtainable, for example, by reacting either a compound of the general formula (2)

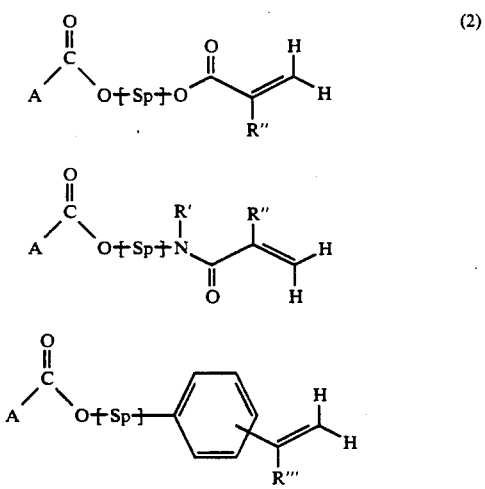

where Sp, R', R" and R'" have the abovementioned meanings and A is a group of the series tosylate, alkoxy, halogen, phosphonium or sulfonium or an ammonium or pyridinium cation, or a compound of the haloglyoxylate type with a compound of the general formula (3)

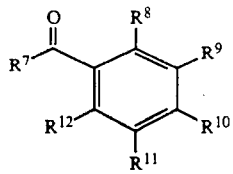

(3)

where $R^7$ is a straight-chain alkyl radical of 1 to 3 carbon atoms, a branched, unsubstituted or substituted alkyl radical of 3 or 4 carbon atoms or aryl and $R^8$ to $R^{12}$ are identical or different and are each H, alkyl of 1 to 4 carbon atoms, OH, $OCH_3$, $OC_2H_5$, SH, $SCH_3$, Cl, F, CN, COOH, $COO(C_1\text{-}C_3\text{-alkyl})$, $CF_3$, $N(CH_3)_2$, $N(C_2H_5)_2$, $N(CH_3)C_6H_5$ or $N^+(CH_3)_3X^-$, where $X^-$ is an acid anion, such as $Cl^-$, $Br^-$, acetate, $HSO_4^-$, $H_2PO_4^-$ and $NO_3^-$, with the proviso that one or more of the radicals $R^8$ to $R^{12}$ is hydroxyl, in an equimolar ratio or a molar ratio of 2:1 or 3:1, in the presence or absence of an inert solvent or solvent mixture and of a basic catalyst, at from 0° to 100° C., under anhydrous conditions.

Monomers of the general formula (I) are furthermore obtainable, for example, by reacting a compound of the general formulae (4) to (6)

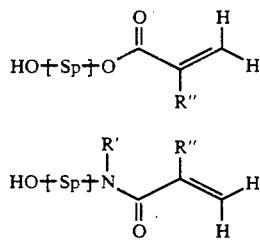 (4)

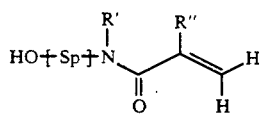 (5)

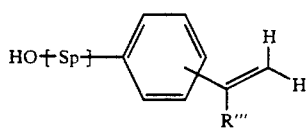 (6)

where Sp, R', R" and R'" have the abovementioned meanings, with a compound of the general formula

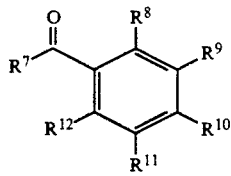 (7)

where $R^7$ is a straight-chain alkyl radical of 1 to 3 carbon atoms, a branched, unsubstituted or substituted alkyl radical of 3 or 4 carbon atoms or aryl and $R^8$ to $R^{12}$ are identical or different and are each H, alkyl of 1 to 4 carbon atoms, OH, $OCH_3$, $OC_2H_5$, SH, $SCH_3$, Cl, F, CN, COOH, $COO(C_1\text{-}C_3\text{-alkyl})$, $CF_3$, $N(CH_3)_2$, $N(C_2H_5)_2$, $N(CH_3)C_6H_5$ or $N^+(CH_3)X^-$, where $X^-$ is an acid anion, such as $Cl^-$, $Br^-$, acetate, $HSO_4^{31}$, $H_2PO_4^{31}$ or $NO_3^-$, with the proviso that one or more of the radicals $R^8$ to $R^{12}$ is a group of the type A-CO-O, where A has the abovementioned meanings, in an equimolar ratio or in a molar ratio of 2:1 or 3:1, in the presence or absence of an inert solvent or solvent mixture and of a basic catalyst, at from 0° to 100° C., under anhydrous conditions.

Regarding the composition, the following may be stated specifically:

Compounds of the formula (2) may be, for example, ω-chloroformylalkyl(meth)acrylates and/or ω-chloroformyl-(meth)acrylamides.

An example of a compound of the formula (7) is 4-chloroformylbenzophenone.

Compounds of the formulae (4) to (6) may be, for example,

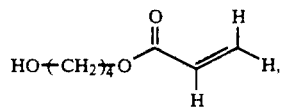

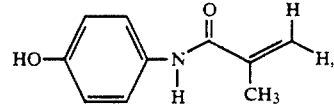

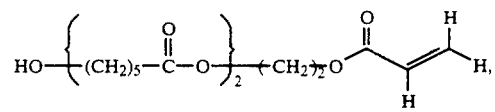

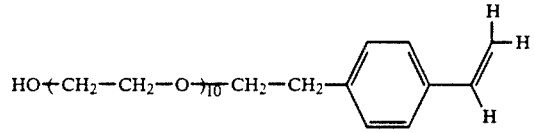

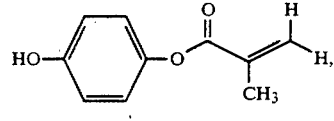

The spacers Sp in square brackets may be, for example,

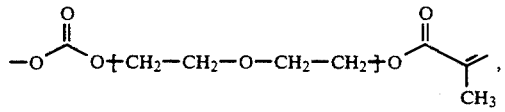

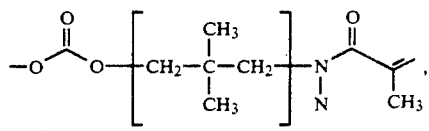

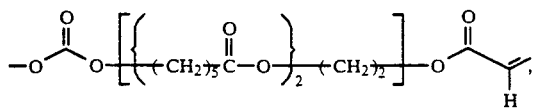

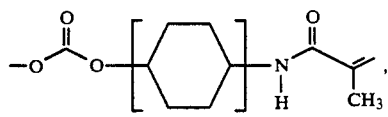

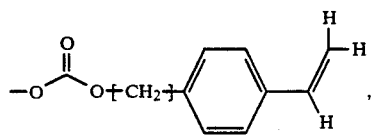

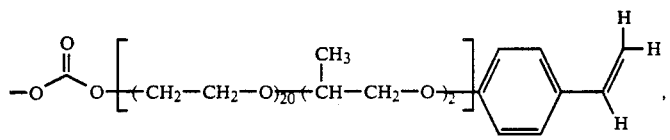

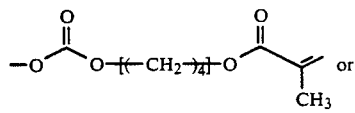

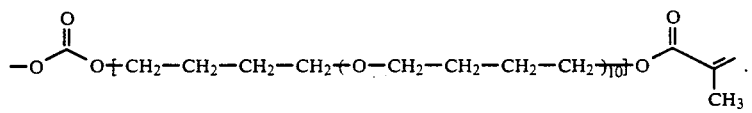

Monomers of the general formula (I) which are of particular interest for the purpose according to the invention are the acrylates and/or methacrylates of the compound II

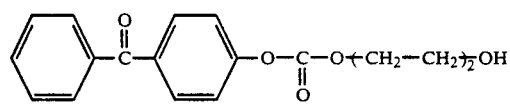

II

Other very suitable monomers of the general formula I (benzophenone derivatives) are the acrylates and methacrylates of the compounds III and IV

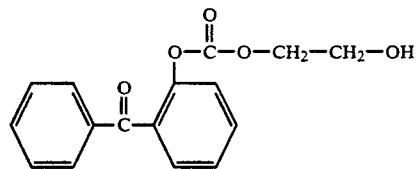

III

IV

Examples of suitable acetophenone derivatives are the acrylates and methacrylates of the compounds V and VI

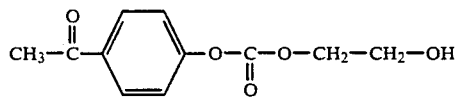

V

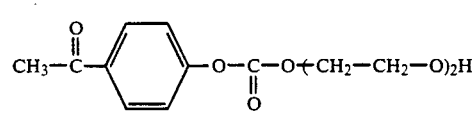

VI

These compounds are acrylates and methacrylates of acetophenone derivatives and of benzophenone derivatives which have a carbonate group in the ortho- or paraposition on a phenyl group of the acetophenone or of the benzophenone.

Other suitable copolymerizable benzophenone derivatives include, for example, the following acrylates and methacrylates IX or XVI.

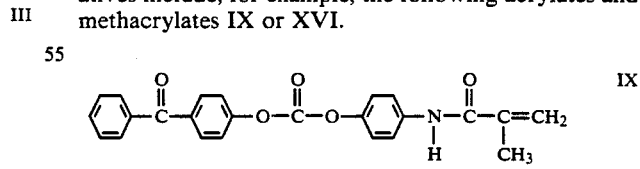

IX

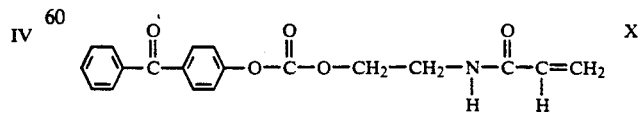

X

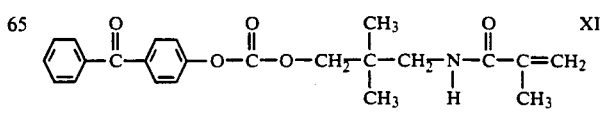

XI

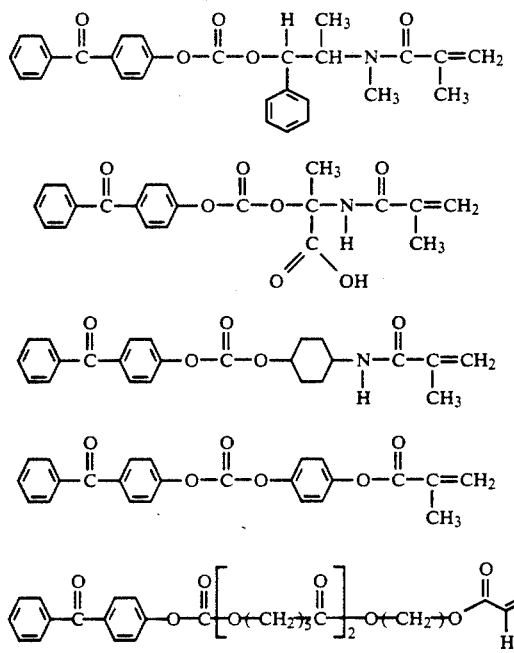

The benzophenone derivatives can be used alone or as a mixture.

Finally, the copolymers may contain further copolymerized monomers having functional groups, in amounts of not more than 20% by weight, based on the weight of the copolymer, for example hydroxyalkyl (meth)-acrylates, such as 2-hydroxypropyl (meth)acrylate, 2-hydroxyethyl (meth)acrylate, 4-hydroxybutyl (meth)-acrylate and glycidyl acrylate and methacrylate. Monoacrylates and monomethacrylates of polyetherols or of propoxylated fatty alcohols, for example having a molecular weight of from 200 to 10,000, or of polyethoxylated alkanols and/or phenols, in amounts of from 0.5 to 10% by weight, may also be advantageous as comonomers in some cases.

It is also possible to use not more than 25% by weight of macromolecular (meth)acrylates, for example those which contain a polystyrene radical, eg. MACROMER ® 13-K PSMA (Sartomer International Inc.).

If the copolymers are to be used as contact adhesives, acrylates and/or methacrylates which are preferably used as principal monomers are those whose homopolymers have glass transition temperatures of less than 0° C., in particular less than −10° C., in particular n-and isobutyl acrylate and methacrylate, isoamyl and isooctyl acrylate and methacrylate and 2-ethylhexyl acrylate and methacrylate, as well as decyl acrylate and lauryl acrylate and methacrylate. The amount of these principal monomers in this case is preferably more than 60% of the total monomers.

The copolymers contain in general from 0.1 to 15%, based on the weight of the copolymer, of copolymerized monomers of the general formula I, although amounts of only from 0.01 to 5%, based on the weight of the copolymer, are frequently sufficient.

The novel UV-crosslinkable (meth)acrylate copolymers can be prepared by copolymerization of monomeric components using the conventional polymerization initiators and, if required, regulators, polymerization being carried out at the conventional temperatures by mass polymerization or in emulsion, for example in water or liquid hydrocarbons, or in solution. The novel copolymers are preferably prepared by polymerization of the monomers in solvents, in particular in those having a boiling range of from 50° to 150° C., preferably from 60° to 120° C., using the conventional amounts of polymerization initiators, which in general are from 0.01 to 10, in particular from 0.1 to 4, % by weight, based on the total weight of the monomers. Particularly suitable solvents are alcohols, such as methanol, ethanol, n-propanol, isopropanol, n-butanol and isobutanol, preferably isopropanol and/or isobutanol, and hydrocarbons, such as toluene and in particular gasolines having a boiling range of from 60° to 120° C. It is also possible to use ketones, such as acetone or methyl ethyl ketone, and esters, such as ethyl acetate, and mixtures of solvents of the stated type, mixtures which contain isopropanol and/or isobutanol in amounts of from 5 to 95, in particular from 10 to 80, preferably from 25 to 60, % by weight, based on the solvent mixture used, being preferred.

Suitable polymerization initiators in the solution polymerization are, for example, 2,2'-azobisisobutyronitrile, acyl peroxides, such as benzoyl peroxide, dilauroyl peroxide, didecanoyl peroxide and isononanoyl peroxide, alkyl peresters, such as tert-butyl perpivalate, tert-butyl per-2-ethylhexanoate, tert-butyl permaleate, tert-butyl perisononanoate and tert-butyl perbenzoate, dialkyl peroxides, such as dicumyl peroxide, tert-butyl peroxide or di-tert-butyl peroxide, and peroxydicarbonates, such as dimyristyl peroxydicarbonate, bicetyl peroxydicarbonate, bis-(4-tert-butylcyclohexyl) peroxydicarbonate, dicyclohexyl peroxydicarbonate and di2-ethylhexyl peroxydicarbonate, hydroxperoxides, such as cumene hydroperoxide and tert-butyl hydroperoxide, and polymerization initiators such as 3,4-dimethyl-3,4-diphenylhexane and 2,3-dimethyl-2,3-diphenylbutane. Particularly preferred polymerization initiators are ketone peroxides, such as methyl ethyl ketone peroxide, acetylacetone peroxide, cyclohexanone peroxide and methyl isobutyl ketone peroxide. In the emulsion polymerization, the conventional initiators, for example Na peroxodisulfate, K peroxcdisulfate and ammonium peroxodisulfate, can be used.

The polymerization can be carried out in a conventional manner in a polymerization apparatus which in general is provided with a stirrer, a plurality of feed vessels, a reflux condenser and a means of heating/cooling and is equipped for working under an inert gas atmosphere and superatmospheric or reduced pressure.

After the solution polymerization, the solvents can be separated off under atmospheric or reduced pressure, the procedure being carried out at elevated temperatures, for example from 100° to 150° C. The novel copolymers can then be used in the solvent-free state, ie. in the form of melts, in particular as hotmelt adhesives but also for coating mineral substances, in particular roof tiles, and as surface coatings. In some cases, it is also advantageous to prepare the novel UV-crosslinkable copolymers by mass polymerization, ie. in the absence of a solvent, the process being carried out batchwise or continuously, for example as described in U.S. Pat. No. 4,042,768.

If the novel copolymers are used in the form of solutions, for example for surface coatings or for coating roof tiles, the mixtures of the copolymers and solvents contain in general from 10 to 900, preferably from 20 to 200, in particular from 25 to 150%, based on the weight of the mixture, of solvents.

In some cases, for example when the novel copolymers are prepared in aqueous emulsion by emulsion polymerization, conventional regulators in the conventional amounts, for example from 0.1 to 15, preferably from 2 to 10, % by weight, based on the monomers, may be concomitantly used. Examples of such regulators are mercapto compounds, such as 2-mercaptoethanol, methyl 3-mercaptopropionate,3-mercaptopropyltrimethoxysilane,3-mercaptopropylmethyldimethyloxysilane, 3-mercaptopropionic acid, 1,6-dimercaptohexane or 1,9-dimercaptononane, hydrocarbons, such as cumene, alcohols, such as isopropanol or isobutanol, and halohydrocarbons, such as carbon tetrachloride, tetrabromomethane, chloroform or bromoform. Preferred regulators are compounds such as 3-mercaptopropionic acid, 3-mercapto-1,2-propanediol, 2-mercaptoethanol, glycerol and di- and triglycerides. Ethers, such as dioxane and tetrahydrofuran, can also be used as regulators.

When they are used, the novel materials may be modified and/or compounded in a conventional manner. For example, conventional tackifiers, for example hydrocarbon resins, unmodified or modified rosins, terpene/phenol resins, ketone resins, aldehyde resins or homopolymers, such as poly-2-ethylhexyl acrylate and poly-α-methylstyrene, plasticizers, for example those based on mono-, di- or polyester compounds, polychlorinated hydrocarbons or liquid paraffins, dyes and pigments, or stabilizers or elastomeric substances, such as natural or synthetic rubber, polyvinyl ethers and polybutadiene oils may be added. Other suitable modifiers are monoolefinically or polyolefinically unsaturated, relatively high molecular weight compounds, such as polyetherols and polyesterols esterified with acrylic acid, such as tripropylene glycol acrylate, tetraethylene glycol acrylate and polyethylene glycol diacrylate. Diacrylates and dimethacrylates of polytetrahydrofuran having number average molecular weights of in general from 250 to 2,000 are also suitable. Such compounds which are diolefinically or polyolefinically unsaturated can advantageously be used in amounts of from 0.1 to 10% by weight, based on the novel copolymer, diolefinically unsaturated compounds of this type having a number average molecular weight of not less than 500 being of particular interest.

The novel UV-crosslinkable materials are particularly suitable as melts or as solutions or in the form of aqueous dispersions for the production of coatings and for impregnation, in particular for the production of contact adhesives, pressure-sensitive adhesive films and pressure-sensitive adhesive labels and hot stamping films. The materials can be applied in a conventional manner by brushing on, spraying, rollercoating, coating with a knife coater or casting, if necessary at elevated temperatures, in general at from 20° to 150° C., to conventional substrates, for example to paper, cardboard, wood, metals and plastics films, for example of plasticized PVC, polyethylene, polyamides, polyethylene glycol terephthalate or polypropylene, and aluminum foils.

If solvents are present, they can readily be evaporated from the coatings, at room temperature or slightly elevated temperatures, in general from 20° to 150° C., preferably from 50° to 80° C., radiant heaters or hot-air circulating apparatuses being used in a conventional manner. The coatings, which may have been dried beforehand, can then be crosslinked by exposure to UV light to give coatings which have good tack, high cohesion and good peeling strength coupled with excellent aging resistance. There is no need to carry out exposure under an inert gas atmosphere; instead, the procedure can be carried out in the air. Suitable UV lamps are the conventional ones, for example low pressure, medium pressure and high pressure mercury vapor lamps which may have powers of, for example, from 80 to 160 watt/cm. Lamps having a higher power generally permit more rapid crosslinking. In some cases, residual solvent or water can be simultaneously removed by the IR component of the lamps during exposure to effect crosslinking.

The adhesive properties of sheet-like substrates which have a contact adhesive layer can be determined by measuring the shear strength as a measure of the cohesion and the peeling strength as an overall measure of cohesion and surface tack.

For the test, films of polyethylene glycol terephthalate are coated with the novel agents so that the resulting thickness of the dry layer is 25 μm.

For testing the solvent-free hotmelt adhesives, polyethylene glycol terephthalate films are coated with the agents on a heatable coating table at from 85 to 120° C. so that the resulting thickness of the layer is about 25 μm.

If dissolved copolymers are used for the test, the solvents are evaporated off for 1 minute at 70° C. and under 1 bar. The coated and dried films are exposed to light from medium pressure mercury vapor lamps.

Exposure is effected using two medium pressure mercury vapor lamps arranged one behind the other, the said lamps each having a power of 80 watt/cm. The coated and dried films are placed on a continuous belt so that the said films pass under the lamps at a distance of 10 cm and at a speed of 20 m/min.

Exposure is carried out in the air.

The films thus produced are cut into 2 cm wide strips, which are applied to a chromium-plated brass sheet. This sheet with the strips are stored for 24 hours at 23° C. and 65% relative humidity.

To measure the peeling strength, the test strips are peeled off backward and parallel to the adhesive layer at a speed of 300 mm/min. The force required for this purpose is measured.

For measuring the shear strength, a bonded area of 20×25 mm is cut out, the sheet is clamped vertically and the projecting part of the adhesive strip is loaded with a weight of 1 kg. The time taken to break the adhesive bond is determined. The measurement is effected at from 23° to 50° C. All measurements are carried out in triplicate.

To measure the loop value, a 2 cm wide adhesive strip having a length of 150 mm is formed into a loop and the two ends of the adhesive strip are clamped in the jaws of a tensile test machine. The loop of adhesive strip is brought into contact with a standard sheet of stainless steel, and the adhesive tape is peeled off at a speed of 300 mm/min. The force required for peeling off the strip from the steel sheet is measured. 6 measurements are averaged.

In the Examples which follow, parts and percentages are by weight. The K values are determined according to DIN 53,726 in 1% strength solution in tetrahydrofuran at 25° C. The melt viscosities are measured using a plate-and-cone rheometer, for example Rotovisko RV 20 with a PK 100 measuring apparatus (Haake, Karlsruhe) (D=shear rate in 1/s).

The viscosity number is determined in tetrahydrofuran at 25° C. by a known method (eg. G.V. Schulz and H. J. Cantow in Houben-Weyl, Methoden der organischen Chemie, G. Thieme Verlag, 1955, Vol. 3/1, pages 431–445, and B. Vollmert, Grundriss der makromolekularen Chemie, Volume III, page 55 et seq.

EXAMPLE 1

Copolymer solution P1

150 g of a monomer mixture of 500 g of isoamyl acrylate, 300 g of 2-ethylhexyl acrylate, 170 g of methyl acrylate, 30 g of acrylic acid and 7.5 g of a benzophenone derivative of the formula VII are added to a mixture of 160 g of ethyl acetate, 50 g of tetrahydrofuran and 9 g of tert-butyl per-2-ethylhexanoate.

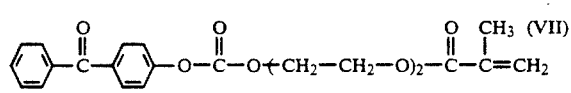

The mixture is polymerized at 85° C. for 15 minutes. The remainder of the monomer mixture is added to the reaction mixture in the course of 2 hours and a solution of 5 g of tert-butyl per-2-ethylhexanoate in 40 g of ethyl acetate is added simultaneously in the course of 3 hours. After the end of the monomer addition, polymerization is continued for a further 5 hours.

A copolymer having a K value of 38.5 and a viscosity number of 0.39 (100 ml/g) is obtained.

The copolymer P1 freed from solvent and volatile components has a melt viscosity of 15 Pa.s (D=100 1/s) at 120° C.

Mixture M 1

500 g of copolymer P 1 are mixed with 62.5 g of a poly-α-methylstyrene resin (Nevbrite 85, Neville Cindu Chemie B.V.) in the melt.

EXAMPLE 2

Copolymer solution P 2

150 g of a monomer mixture of 500 g of n-butyl acrylate, 330 g of 2-ethylhexyl acrylate, 150 g of methyl methacrylate, 20 g of acrylic acid and 7.5 g of a benzophenone derivative of the general formula IV are added to a mixture of 160 g of ethyl acetate, 50 g of tetrahydrofuran, 10 g of tert-butyl per-2-ethylhexanoate.

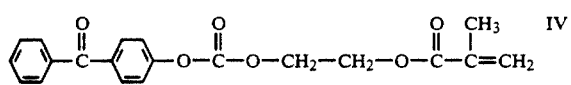

The mixture is polymerized at 80° C. for 15 minutes. The remainder of the monomer mixture is added to the reaction mixture in the course of 2 hours, and a solution of 5 g of 2-butyl per-2-ethylhexanoate in 40 g of ethyl acetate is added simultaneously in the course of 3 hours. After the end of the monomer addition, polymerization is continued for a further 5 hours.

A copolymer having a K value of 42 and a viscosity number of 0.40 (100 ml/g) is obtained.

The copolymer P 2 freed from solvent and volatile components has a melt viscosity of 20 Pa.s at 120° C. (D=200 1/s).

Mixture M 2

500 g of copolymer P 2 are mixed with 50 g of a rosin (Foral 85, Hercules) in the melt.

EXAMPLE 3

Copolymer solution P 3

270 g of a monomer mixture of 870 g of 2-ethylhexyl acrylate, 100 g of methyl acrylate, 30 g of acrylic acid and 2.0 g of the benzophenone derivative of the general formula VIII are added to a mixture of 280 g of a gasoline having a low content of n-hexane and a boiling range of from 60° to 95° C. and 70 mg of 2,2'-azobisisobutyronitrile (Porofor N).

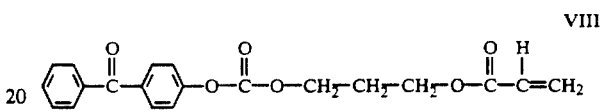

The reaction mixture is polymerized for 15 minutes at the reflux temperature. Thereafter, the remainder of the monomer mixture is added in the course of 2 hours and, after the end of the addition, the mixture is refluxed gently for a further 2 hours. 10% by weight of a solution of 10 g of tert-butyl perpivalate in 50 g of gasoline having a low n-hexane content and a boiling range of from 60° to 95° C. are then added to the reaction mixture in the course of 5 minutes. After a further hour, the remainder of this solution and, simultaneously, 670 g of gasoline having a low n-hexane content and a boiling range of from 60° to 95° C. are added.

A solution of copolymer P 3 having a K value of 68 is obtained.

EXAMPLE 4

Copolymer P 4

The procedure is similar to that for copolymer P 2, except that a mixture of 800 g of isoamyl acrylate, 180.0 g of vinyl acetate, 20 g of methacrylic acid and 7.0 g of the benzophenone derivative IX is polymerized. A copolymer having a K value of 36.1 is obtained.

EXAMPLE 5

Copolymer P 5

The procedure is similar to that for copolymer P 2, except that a mixture of 900 g of isoamyl acrylate, 100 g of Macromer® 13 K-RC monomer (styrene oligomer having a terminal methacrylate group, from Sartomer Inc.) and 6.5 g of the benzophenone derivative II is polymerized. A copolymer having a K value of 34.5 is obtained.

TABLE 1

| Results of the application tests as a contact adhesive | | | | | |
|---|---|---|---|---|---|
| | Shear strength [hours] at | | Peel strength [N/2 cm] | | Loop value | Touch |
| Sample | 23° C. | 50° C. | Immediately | After 24 hours | [N/2 cm] | tack*) |
| P 1 | >100 | >24 | 9.1 | 12.6 | — | Very good |
| M 1 | >24 | >10 | 9.7 | 14.5 | — | Good |
| P 2 | >100 | >24 | 6.5 | 9.2 | — | Good |
| M 2 | >24 | >10 | 7.0 | 11.2 | — | Good |
| P 3 | >100 | >24 | 6.0 | 7.5 | — | Good |
| P 4 | >24 | >24 | 11.7 | 19.0 | 11.3 | Good |

TABLE 1-continued

Results of the application tests as a contact adhesive

| Sample | Shear strength [hours] at 23° C. | 50° C. | Peel strength [N/2 cm] Immed- iately | After 24 hours | Loop value [N/2 cm] | Touch tack[*] |
|---|---|---|---|---|---|---|
| P 5 | >100 | >10 | 5.5 | 8.5 | — | Good |

[*] The touch tack was assessed by a group

EXAMPLE 6

Copolymer P 6

A copolymer having a K value of 40 is prepared by polymerizing a monomer mixture of 350 g of styrene, 300 g of n-butyl acrylate, 330 g of methyl methacrylate, 20 g of acrylic acid and 50 g of the benzophenone derivative II. For use as a UV-crosslinkable hotmelt adhesive, the copolymer is dried and milled to give a powder.

Steel sheets are coated with the powder, and the powder coatings are converted into films at 130° C. in the course of 30 minutes and then immediately, without a long cooling phase, exposed for 2 minutes to UV light from a UV flat-plate exposure unit (Uvaspot 400 K from Dr. Hönle). A clear glossy film was obtained.

| Test sheet | Test 1 | Test 2 |
|---|---|---|
| Film thickness | 55 μm | 53 μm |
| UV exposure | No | Yes |
| Cupping (DIN 53,156) | 2.8 | 8.5 |
| Pendulum damping (DIN 53,157) | 105″ | 160″ |
| Resistance to ethanol[*] | — | + |

[*] The resistance to ethanol was tested by wiping with a cotton wool ball moistened with ethanol
—: Swelling and delamination of the film
+: No delamination of the film

EXAMPLE 7

Copolymer P 7

A copolymer having a K value of 38 is prepared by polymerizing a monomer mixture of 345 g of styrene, 305 g of isoamyl acrylate, 330 g of methyl methacrylate, 20 g of acrylic acid and 45 g of the benzophenone derivative II. For use as a UV-crosslinkable hotmelt adhesive, the copolymer is dried.

The copolymer, in the form of a melt at 150° C., is applied to steel sheets in a film thickness of about 50 μm using a knife coater and then exposed to UV light at 100° C. for 1 minute.

At the same time, a sheet was coated but not exposed.

| Test sheet | Test 3 | Test 4 |
|---|---|---|
| Film thickness | 49 μm | 48 μm |
| UV exposure | No | Yes |
| Cupping (DIN 53,156) | 3.1 | 9.5 |
| Pendulum damping (DIN 53,157) | 100″ | 172″ |
| Resistance to ethanol | — | + |

EXAMPLE 8

Copolymer P 8

A copolymer having a K value of 32 is prepared by polymerizing a mixture of 500 g of n-butyl acrylate, 325 g of isobutyl acrylate, 150 g of methyl acrylate and 10 g of the benzophenone derivative X and using 25 g of 3-mercaptopropyltriethoxysilane as a polymerization regulator. The copolymer freed from the solvent and volatile components exhibits flow at room temperature and is suitable as a UV-crosslinkable sealing compound.

We claim:

1. A UV-crosslinkable material comprising a copolymer of (i) an ester of (meth)acrylic acid and a $C_1$–$C_{24}$ alkanol, having a K value of from 10 to 150, and (ii) from 0.01 to 20% by weight, based on the copolymer, of at least one copolymerized monomer of the formula I $$\underset{R}{\overset{O}{\underset{\|}{C}}}\underset{R^1}{}$$  (I)

where R is a straight-chain alkyl of 1 to 3 carbon atoms, branched, unsubstituted or substituted alkyl of 3 to 4 carbon atoms, aryl or a radical $R^1$ and
$R^1$ is a radical

[benzene ring with substituents $R^2, R^3, R^4, R^5, R^6$]

where $R^2$ to $R^6$ are identical or different and are each H, aryl of 1 to 4 carbon atoms, a non-ortho OH group, $OCH_3$, $OC_2H_5$, SH, $SCH_3$, CL, F, CN, COOH, $COO(C_1$–$C_3$-alkyl), $CF_3$, $N(CH_3)_2$, $N(C_2H_5)_2$, $N(CH_3)C_6C_5$, $^+N(CH_3)_3X^-$, or $^+N(CH_3)_2X^-$, where $X^-$ is an acid anion, eg. $Cl^-$, $Br^-$, acetate, $HSO_4^-$, $H_2PO_4^-$ or $NO_3^-$ and one or more of the radicals $R^2$ to $R^6$ are a radical $$-O\overset{O}{\overset{\|}{C}}O+Sp+N-\underset{\underset{R''}{\overset{\|}{O}}}{\overset{R'}{\overset{|}{C}}}-C=CH_2$$

or $$-O\overset{O}{\overset{\|}{C}}O+Sp+O-\underset{\underset{R''}{\overset{\|}{O}}}{\overset{}{C}}-C=CH_2$$

or $$-O\overset{O}{\overset{\|}{C}}O+Sp+\underset{R'''}{\underset{}{\phantom{X}}}\text{—phenyl—}CH=CH_2$$

where Sp is one of the spacer groups of the following type $+(+X)_k Y+_l +X)_m+$ and/or $+(+X)_k Y+_l +(+X)_m Y+_n+$ and R' is H, C₁-C₄-alkyl or phenyl,
R" is H or C₁-C₄-alkyl and
R'" is H or CH₃ and where the radicals X may be identical or different and are each a divalent, unsubstituted or substituted alkylene radical which may be perfluorinated, an unsubstituted or substituted cycloalkylene radical of 5 to 10 carbon atoms or an unsubstituted or substituted o-, m- or p-phenylene radical, which are bonded directly to one another and/or are bonded to one another by idential or different groups Y, and Y is a divalent radical from the group consisting of

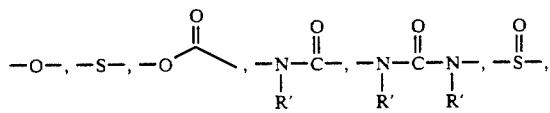

-continued

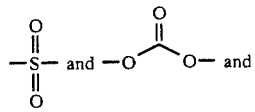

k and m are each from 1 to 10 and
l and n are each from 0 to 25.

2. A UV-crosslinkable material as claimed in claim 1 which contains a compound of the formula

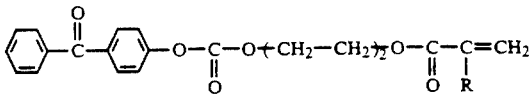

as a copolymerized monomer of the formula I, where R is H or CH₃.

3. A UV-crosslinkable material as claimed in claim 1, which additionally contains from 0.1 to 50% by weight, based on its weight, of a tackifier.

4. A UV-crosslinkable material as claimed in claim 3, which contains rosins, coumarone/indene resins and/or poly-α-methylstyrene as tackifiers.

* * * * *

UNITED STATES PATENT AND TRADEMARK OFFICE
CERTIFICATE OF CORRECTION

PATENT NO. : 5,128,386

DATED : July 7, 1992

INVENTOR(S) : Gerd Rehmer et al.

It is certified that error appears in the above-identified patent and that said Letters Patent is hereby corrected as shown below:

Title page item (75):
The second inventor's name is spelled incorrectly, should be, --Andreas Boettcher--.

Signed and Sealed this

Seventh Day of September, 1993

Attest:

BRUCE LEHMAN

Attesting Officer  Commissioner of Patents and Trademarks